(12) United States Patent
Huizinga et al.

(10) Patent No.: US 8,733,182 B2
(45) Date of Patent: May 27, 2014

(54) FORCE SENSOR ASSEMBLY AND METHOD FOR ASSEMBLING A FORCE SENSOR ASSEMBLY

(75) Inventors: Alex Huizinga, Almelo (NL); Robert Zwijze, Vriezenveen (NL); Martijn Pijpers, Enschede (NL); Bennie Berkel, Wierden (NL)

(73) Assignee: Sensata Technologies, Inc., Attleboro, MA (US)

( * ) Notice: Subject to any disclaimer, the term of this patent is extended or adjusted under 35 U.S.C. 154(b) by 12 days.

(21) Appl. No.: 13/531,970

(22) Filed: Jun. 25, 2012

(65) Prior Publication Data

US 2013/0014595 A1   Jan. 17, 2013

(30) Foreign Application Priority Data

Jul. 12, 2011   (EP) ...................................... 11173545

(51) Int. Cl.
*G01L 1/22* (2006.01)
(52) U.S. Cl.
USPC .................................................... 73/862.045

(58) Field of Classification Search
USPC ....................................................... 73/862.45
See application file for complete search history.

(56) References Cited

U.S. PATENT DOCUMENTS

| 6,487,911 | B1 * | 12/2002 | Frackelton et al. | 73/718 |
| 7,383,737 | B1 * | 6/2008 | Lin et al. | 73/718 |
| 7,412,894 | B2 * | 8/2008 | Ueyanagi et al. | 73/753 |
| 7,570,065 | B2 * | 8/2009 | Harish et al. | 324/662 |
| 7,739,922 | B2 * | 6/2010 | Inamori | 73/862.044 |
| 8,156,816 | B2 * | 4/2012 | Willner et al. | 73/720 |
| 2007/0205776 | A1 * | 9/2007 | Harish et al. | 324/662 |
| 2009/0315864 | A1 * | 12/2009 | Silverbrook et al. | 345/179 |
| 2010/0052578 | A1 * | 3/2010 | Kim | 318/114 |

\* cited by examiner

*Primary Examiner* — Lisa Caputo
*Assistant Examiner* — Jamel Williams
(74) *Attorney, Agent, or Firm* — Chapin IP Law, LLC

(57) ABSTRACT

The force sensor assembly has axis of measurement along an axial direction of the force sensor assembly and comprises a force ring provided with at least two sensing elements, a printed circuit board having electronic components thereon, a covering plate for holding the printed circuit board onto the force ring, and a sensor cap covering the printed circuit board and covering plate and attached to the force ring. Manufacturing is easily accomplished using stacking, fixing and welding.

20 Claims, 5 Drawing Sheets

FORCE SENSOR ASSEMBLY AND METHOD FOR ASSEMBLING A FORCE SENSOR ASSEMBLY

CROSS REFERENCE TO RELATED APPLICATIONS

The present application claims the benefit of European Patent Application No. 11173545.2, filed on Jul. 12, 2011, entitled "Force Sensor Assembly And Method For Assembling A Force Sensor Assembly," which is incorporated herein by reference in its entirety.

BACKGROUND

The present invention relates to a force sensor assembly having an axis of measurement along an axial direction of the force sensor assembly.

German patent application DE-A-103 50 085 discloses a measurement device for an electromagnetic brake. The measurement device comprises a closed ring member having a C-shaped profile, which deforms under a force being applied in the axial direction in a brake system. The C-shaped profile is provided with e.g. strain gauges that can measure the amount of deformation of the C-shaped profile (e.g. oriented in a radial direction).

UK patent application GB-A-2 147 426 discloses a ring-shaped load-measuring device, allowing to measure an axial force applied on the measuring device. A ring is provided with a special shape, such that under force a region of the ring is placed into hoop tension, and a further region of the ring is placed into hoop compression. Sensing elements such as strain gauges are positioned on each of the two regions, and the force can be calculated from the sensor element signals.

SUMMARY

The present invention provides a force sensor assembly, particularly suited for axial force measurement, which can be manufactured in an easy, reliable and cost-effective manner.

According to the present invention, a force sensor assembly according to the preamble defined above is provided, comprising a force ring provided with at least two sensing elements, a printed circuit board having electronic components thereon, a covering plate for holding the printed circuit board onto the force ring, and a sensor cap covering the printed circuit board and covering plate and attached to the force ring.

Such a force sensor assembly is easier to assemble than prior art force sensors, and also more cost-effective to manufacture. It can typically be applied in the automotive industry, more particular as a force sensor assembly in an electromagnetic brake system.

According to a further aspect of the present invention, a method of assembling a force sensor assembly provided, comprising stacking a printed circuit board having electronic components with a covering plate, fixing the printed circuit board and the covering plate on a force ring provided with at least two sensing elements, by attaching the covering plate to the force ring, electrically connecting the at least two sensing elements to the printed circuit board, welding an outer rim and an inner rim of a sensor cap covering the printed circuit board and covering plate to the force ring.

BRIEF DESCRIPTION OF THE DRAWINGS

The present invention will be discussed in more detail below, using a number of exemplary embodiments, with reference to the attached drawings.

FIG. 7b shows a side view of the force ring shown in FIG. 7a.

DETAILED DESCRIPTION

The present disclosure relates to a force sensor assembly, more specifically a force sensor assembly which can be used in automotive applications. The force sensor assembly 1 is adapted to measure a force in an axial direction, which is e.g. applied in measuring the force in an electromagnetic brake system (e.g. using a caliper).

Figure 1:
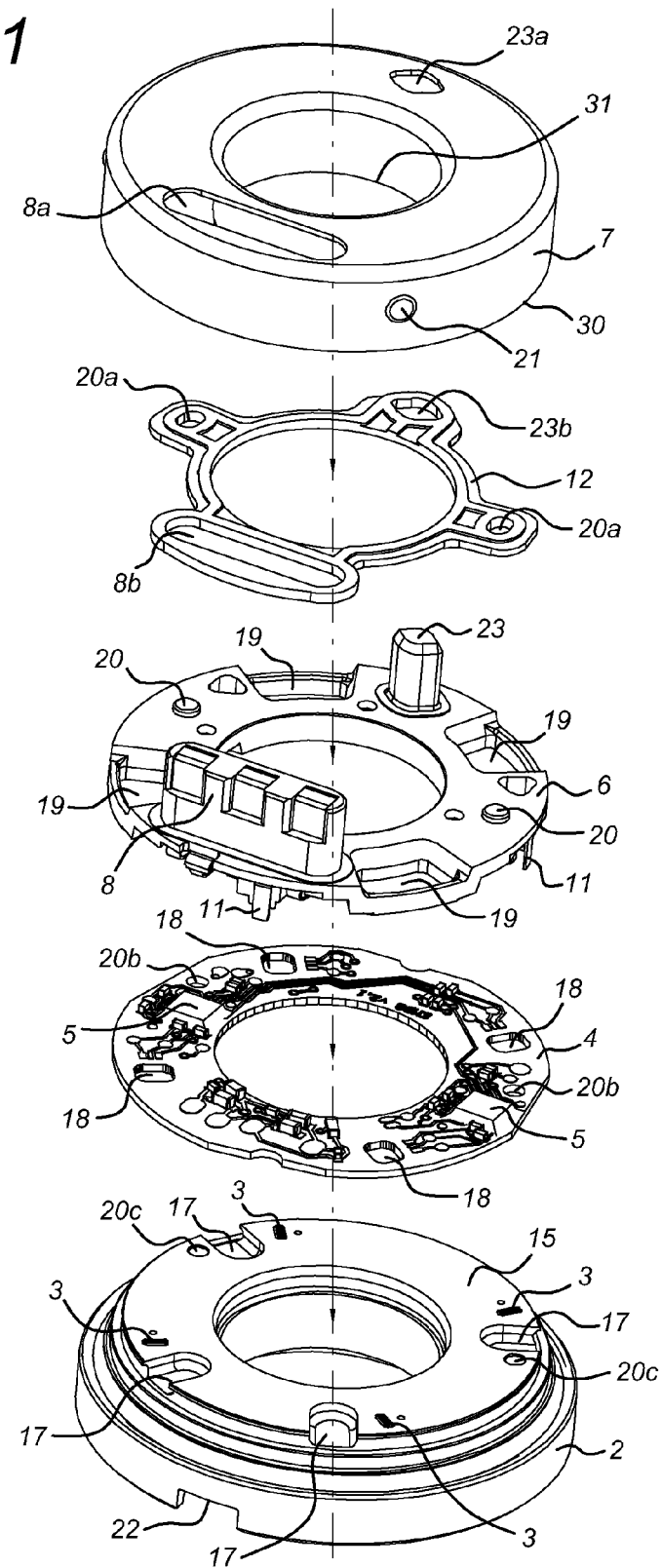
FIG. 1 shows an exploded view of a force sensor assembly according to a first embodiment of the present invention, wherein the main elements are shown separately.

FIG. 1 shows an exploded view of a force sensor assembly according to a first embodiment of the present invention, wherein the main elements are shown separately. One of the main elements of the force sensor assembly 1 is a force ring 2, on which strain gages 3 (e.g. silicon strain gages such as micro-fused silicon strain gages (MSG)) are attached to measure a deformation of the force ring 2. The force ring 2 may be a metal generally cylinder shaped body with an upper surface 15 perpendicular to its longitudinal axis 14, wherein a force is applied on one direction on an outer region and in an opposite direction in an inner region, causing a deformation of the upper surface 15. The force ring 2 may be produced using metal injection molding techniques.

The other main elements of the force sensor assembly 1 are a printed circuit board 4 (or equivalent holder) on which electronic components 5 are positioned (integrated circuits, and passive elements such as resistors, capacitors, etc.). Also a covering plate 6 is provided, which is used to fix the PCB 4 to the force ring 2, and provides a number of functions, which will be discussed below. A sensor cap 7 is provided for providing a cover of the force sensor assembly 1 and for providing sufficient functional interfaces such as a connector 8. Optionally a sealing member 12 is provided which in co-operation with the sensor cap 7 ensures that the internal components of the force sensor assembly 1 are not exposed to the environment. For this, the sealing member 12 may be made of a compressible material.

Figure 2:
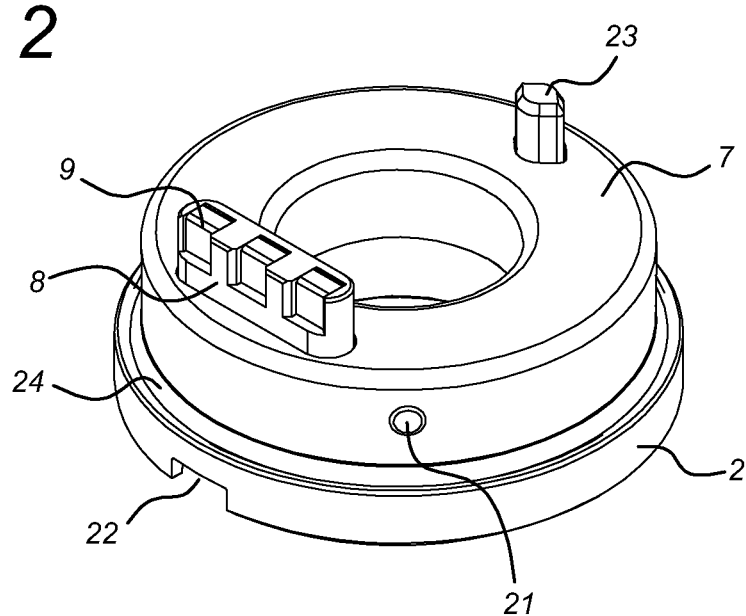
FIG. 2 shows a perspective view of the force sensor assembly of FIG. 1 when assembled.
Figure 3:
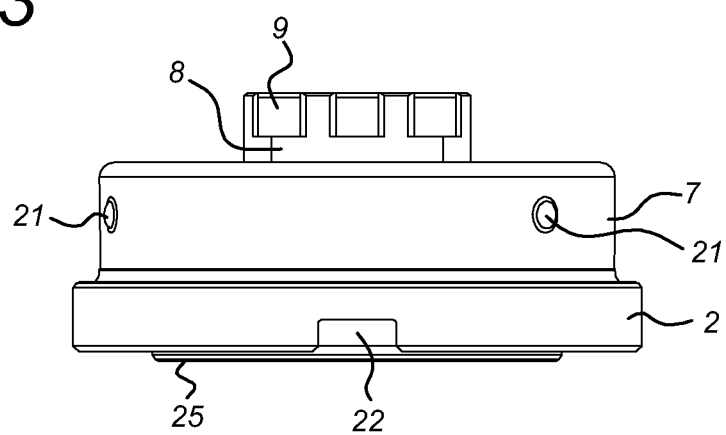
FIG. 3 shows a side view of the force sensor assembly of FIG. 2.
Figure 4:
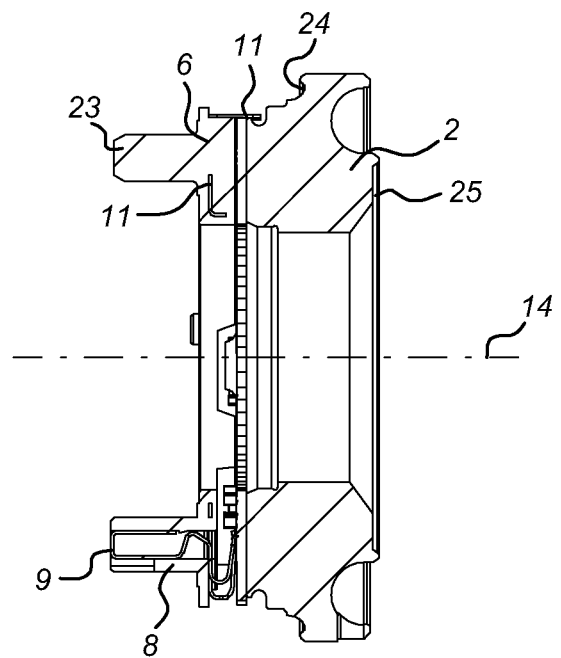
FIG. 4 shows a cross sectional view of the force sensor assembly of FIG. 2.

In FIG. 2 a perspective view of the force sensor assembly of FIG. 1 is shown when assembled, and FIG. 3 shows a side view of the same embodiment. Furthermore, in FIG. 4 a cross sectional view is shown of this embodiment of the force sensor assembly 1. In assembled state, the force ring 2 of the force sensor assembly 1 is visible, as well as the sensor cap 7, connector 8 (with leaf spring connector elements 9, see also the cross sectional view of FIG. 4) and some orientation elements 21, 23 (to be discussed below). Furthermore, in this embodiment, the force ring 2 is provided with an additional orientation element 22 in the form of a notch in the bottom and outer region of the force ring 2. Furthermore, the force attachment regions 24, 25 of the force ring 2 are indicated in these figures, e.g. for use of the force sensor assembly 1 in an electromagnetic brake system, where the inner force attachment region 25 is e.g. in contact with the brake piston, and the outer force attachment region 24 is in contact with the brake caliper. The force attachment regions 24, 25 can be used over their entire circumferential surface, or it is possible to use a number of point force contact surfaces.

Figure 5:
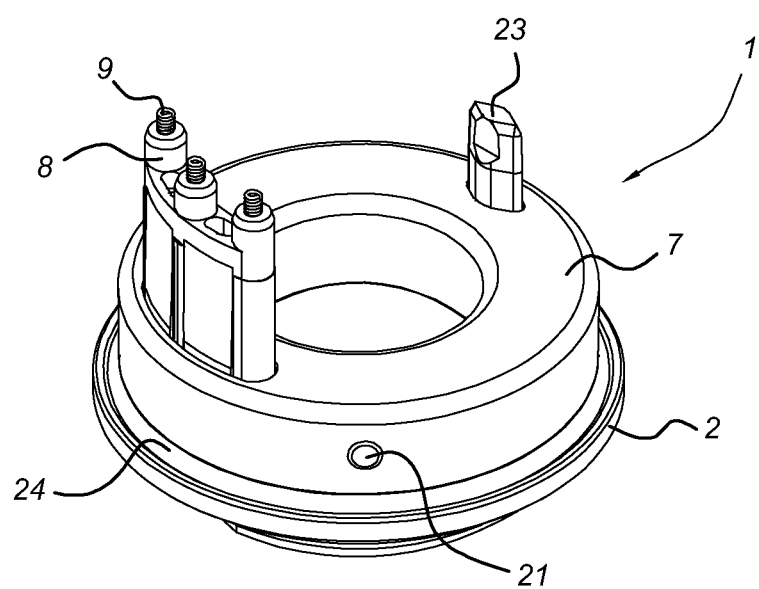
FIG. 5 shows a perspective view of a force sensor assembly according to a second embodiment of the present invention.
Figure 6:
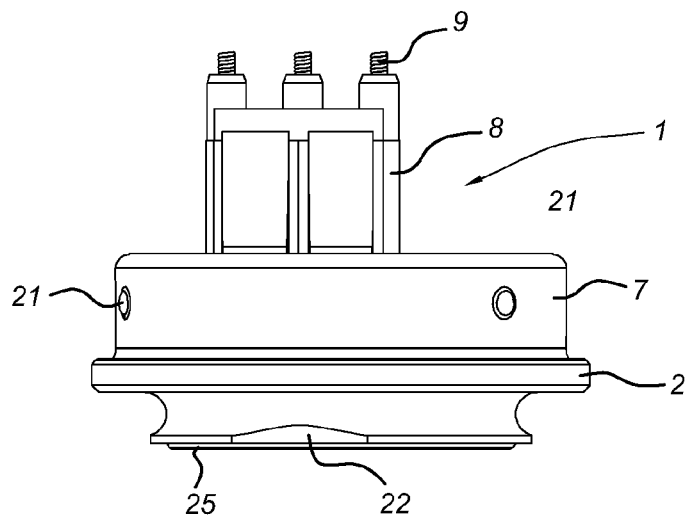
FIG. 6 shows a side view of the force sensor assembly of FIG. 5.

FIG. 5 shows a perspective view of a force sensor assembly according to a second embodiment of the present invention and FIG. 6 shows a side view of the force sensor assembly of FIG. 5. This embodiment is provided with a connector 8 and connector springs 9 in the form of coil springs, which allow a connection to the connector in an axial direction, whereas the embodiment of FIG. 1-4 would also allow a connection in a tangential direction. Furthermore, the shape of the force ring 2 in this embodiment is different, providing a different force to signal behavior of the force sensor assembly 1. Finally this second embodiment is provided with an orientation element 22 at the bottom side of the force ring 2 in the form of a local flattening of the force ring parallel to the measurement axis 14.

In general wording, the present invention embodiments relate to a force sensor assembly 1 having an axis of measurement along an axial direction 14 of the force sensor assembly 1. The force sensor assembly 1 comprises a force ring 2 provided with at least two sensing elements 3, a printed circuit board 4 having electronic components 5 thereon, a covering plate 6 for holding the printed circuit board 4 onto the force ring 2, and a sensor cap 7 covering the printed circuit board 4 and covering plate 6 and attached to the force ring 2.

The covering plate 6 further accommodates an electrical connector 8, extending through a corresponding opening 8a in the sensor cap 7 when assembled (and through an opening 8b in the sealing member 12 when present). The electrical connector 8 e.g. comprises a housing element, which provides space for holding a number of connector spring 9, which are held to the printed circuit board 4 under force. In the embodiment of FIG. 1-4, the connector springs 9 are leaf springs (visible in the cross sectional view of FIG. 4), allowing a mating connector to be connected in a tangential direction to the measurement axis 14, which in some applications provides additional ease of installation of the force sensor assembly. In the embodiment of FIG. 5-6, the connector springs 9 are coil springs, which are held by the electrical connector 8 in force contact with the PCB 4 in the axial direction.

The covering plate 6 provides for a number of functions in the force sensor assembly 1. In one embodiment, the covering plate 6 comprises an internal metal clip 11, of which a two extending clips are visible in the exploded view of FIG. 1. These extending clips can be attached to the force ring 2 (e.g. by contact welding) holding the PCB 4 and the covering plate 6 to the force ring, and possibly providing a case ground for the force sensor assembly 1. As also shown in the cross sectional view of FIG. 4, the force ring 2 is provided with assembly features allowing attachment of the extending clips 11 of the cover plate 6, e.g. against a rim of the force ring 2 (or alternatively in holes or grooves at the circumference of the force ring 2).

The covering plate 6 may further comprise a plastic material, covering the internal metal clip 11 (entirely or partially), and which provides for an insulating covering of the PCB 4, but can also provide multiple orientation elements 20, 23 used in assembling the force sensor assembly 1. In a further embodiment, the covering plate 6 may be integrated with the sealing member 12, e.g. using a multi-compound molding technique.

As can be seen in the exploded view of FIG. 1, orientation elements 20 are provided on the top surface 15 of the covering plate 6, which co-operate with corresponding openings 20a in the sealing member 12. At roughly the same position, also orientation elements 20 may be provided at the bottom surface of the covering plate 6, which co-operate with corresponding openings 20b in PCB 4 and notches 20c in the force ring 2. Of course, the orientation elements 20 on top and bottom surface of the covering plate may be positioned at different mutual positions.

Furthermore, the covering plate 6 may be provided with an external orientation element 23, which protrudes through an opening 23a in the sensor cap 7 (and a corresponding opening 23b in sealing member 12). In the embodiments shown, the external orientation element 23 is provided roughly diametrically opposite the electrical connector 8, allowing a reliable and robust external attachment. In alternative embodiments, the external orientation element 23 is positioned at a different position with respect to the connector 8.

Figure 7A:
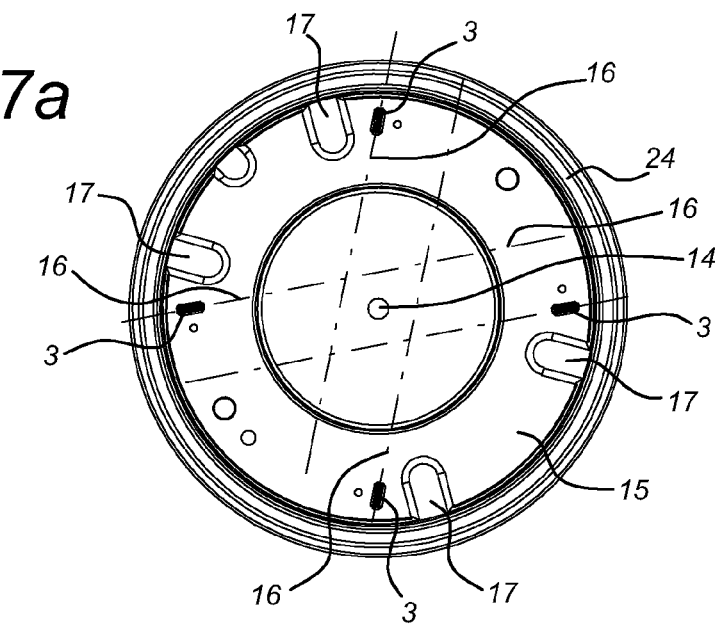
FIG. 7a shows a top view of a force ring as useable in a force sensor assembly according to a further embodiment of the present invention.
Figure 7B:
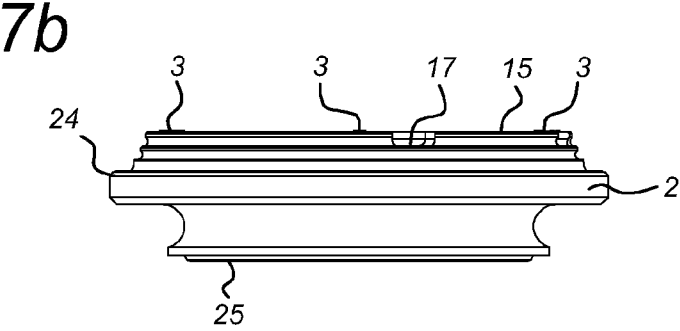

FIG. 7a shows a top view of a force ring 2 as useable in a force sensor assembly 1 according to a further embodiment of the present invention, and FIG. 7b shows a side view of the force ring 2 shown in FIG. 7a. The measurement axis of the force sensor assembly 1 is indicated by 14 and extends perpendicular to the drawing surface of FIG. 7a.

In general, to be able to measure the distortion of the force ring 2 under axial loading, the at least two sensing elements 3 are evenly distributed on a circle on a top surface 15 of the force ring 2. In an embodiment, the top surface 15 is sand blasted to provide a good attachment surface for the sensing elements 3, which are e.g. micro-fused silicon strain gauges (MSG).

In a further embodiment, the at least two sensing elements 3 (e.g. four elements 3 as shown in the embodiment of FIGS. 7a and 7b) each have a sensitivity orientation (indicated by dashed lines 16) in a plane corresponding to a top surface 15 of the force ring 2, the sensitivity orientations 16 being directed at an angle to the center axis of the force sensor assembly 1 (indicated by 14 in FIG. 7a). This allows a better access to the sensing elements 3 for wire bonding purposes during assembly of the force sensor assembly 1.

In yet a further embodiment, the force ring 2 is provided with (symmetrically positioned) profiling features 17, e.g. in the form of indentations or grooves as shown in the embodiment of FIG. 7a. These profiling features 17 will lower the tangential strain at the sensing elements 3 and make the force sensor assembly 1 more robust and reliable. As shown most clearly in the exploded view of FIG. 1, the printed circuit board 4 and the covering plate 6 are provided with openings 18, 19. These openings 18, 19 are aligned with the positions of the at least two sensing element 3 on the force ring 2, allowing bonding of the contacts of the sensing elements 3 to corresponding bonding pads on the printed circuit board 4 after partial assembly of the force ring 2, printed circuit board 4 and covering plate 6. After this electrical connection of the sensing elements 3 to the electronic components 5 on the PCB 4, the at least two sensing elements 3 are covered with a protective material (e.g. a gel like material) in the voids provided by the openings 18, 19, in a further embodiment.

Figure 8:
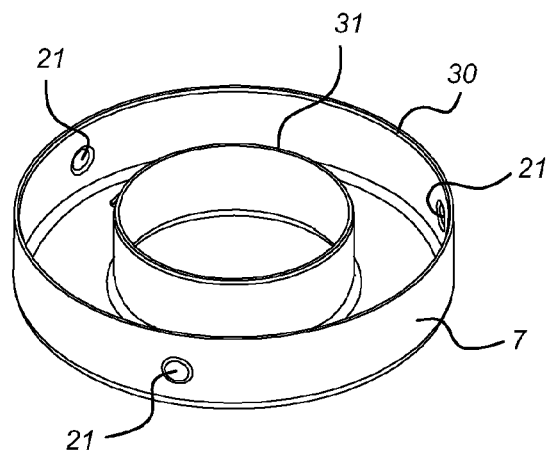
FIG. 8 shows a perspective view of a sensor cap useable in an embodiment of the force sensor assembly according to the present invention.

FIG. 8 shows a perspective view of a sensor cap 7 useable in an embodiment of the force sensor assembly 1 according to the present invention. An outer rim 30 and inner rim 31 are provided, which can be (laser) welded to the force ring 2 as shown in the FIGS. 2, 3, 5, and 6. Furthermore, the sensor cap 7 is provided with at least one orientation element 21, e.g. one or three dimples extending from the side of the sensor cap 7. These orientation elements can be advantageously used to aid in centering when installing the force sensor assembly 1.

Figure 9:
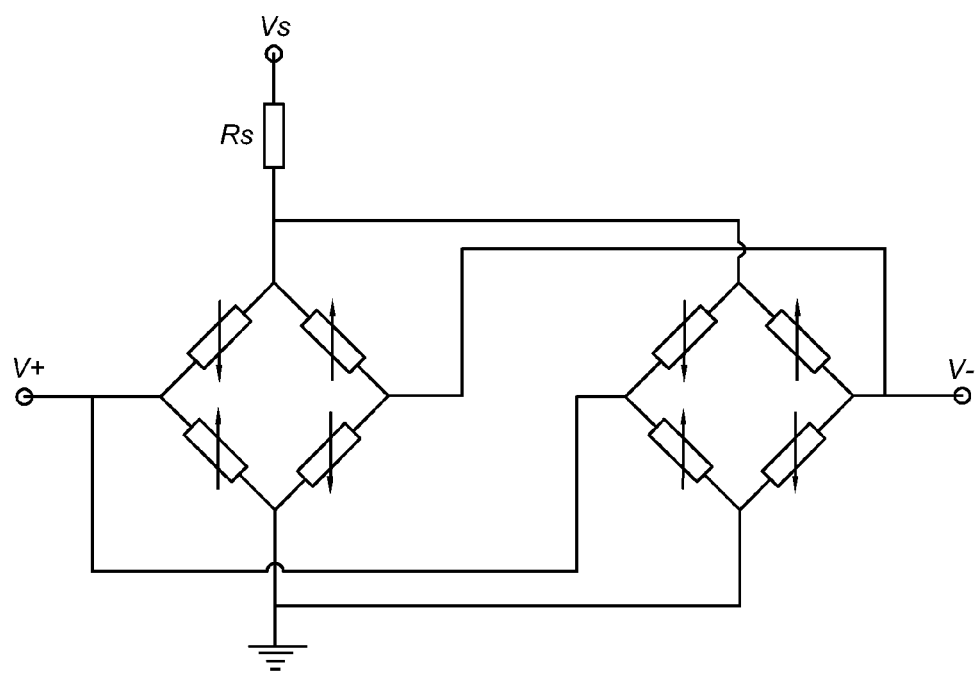
FIG. 9 shows an electrical circuit diagram of the electronic components used in a further embodiment of the force sensor assembly according to the present invention.

In FIG. 9, an electrical circuit diagram is shown of (part of) the electronic components 5 and at least two sensing elements 3 used in a further embodiment of the force sensor assembly 1 according to the present invention. The at least two sensing elements 3 in this embodiment comprise four strain gauges (two impedances each), which are arranged in a double parallel Wheatstone bridge configuration as indicated. The electrical circuit of the force sensor assembly 1 can then be externally connected. The signals V+ and V− are connected to processing circuitry, e.g. an ASIC, which is arranged to apply a temperature compensation gain and offset to the differential voltage and to provide an analogue force signal. Then, using connector 8) with only three wires (analogue force signal, supply voltage Vs, and signal ground) the connection to the outside world can be made. In an alternative arrangement, each half Wheatstone bridge is connected to processing electronics (provided as electronic components 5 on the PCB 4), and each of these signals can be connected to an external unit (e.g. a controller unit for the electromagnetic brakes mentioned earlier). This can be implemented using suitable electronic components 5 to provide digital signal processing, and possibly a digital interface, which can even be provided as a single wire output. Such a digital interfacing provides for more data signals over a single pin, and a more reliable connection than an analog signal output (e.g. allowing error detection and correction circuitry external to the force sensor assembly 1). Suitable interfacing is e.g. provided using SPI (Serial Peripheral Interface) or LIN (Local Interconnect Network) standards.

A further aspect of the present invention relates to a method of manufacturing a force sensor assembly. The method comprises stacking a printed circuit board 4 having electronic components 5 thereon with a covering plate 6, fixing the printed circuit board 4 and the covering plate 6 on a force ring 2 provided with at least two sensing elements 3. This can be effected by attaching (e.g. welding) the covering plate 6 (e.g. using multiple extending pins of the internal metal clip 11) to the force ring 2. Subsequently, the at least two sensing elements 3 are electrically connected to the printed circuit board 4 (e.g. using wire bonds, through the openings 18, 19 provided in the covering plate 6 and PCB 4). Finally, an outer edge or outer rim 30 and an inner edge or inner rim 31 of the sensor cap 7 covering the printed circuit board 4 and covering plate 6 are welded to the force ring 2. The welding steps are e.g. implemented as laser welding, which is suitable for the orientations and spaces available in assembly of the force sensor assembly. As this assembly only involves simple operations (only stacking, welding, bonding and welding of the sensor cap), the assembly can be implemented cost-effectively and reliable. Also the assembly steps involved will introduce only very moderate strain in the force ring 2, which can easily be accommodated for by using a calibration step after complete assembly.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A force sensor assembly having an axis of measurement along an axial direction of the force sensor assembly, comprising:
    a deformable force ring having force-receiving regions arranged to receive oppositely directed forces whereby the force ring may deform in response to application of forces to the force-receiving regions, the force ring having at least two sensing elements arranged to generate a signal corresponding to the degree of force ring deformation;
    a printed circuit board disposed directly against a surface of the force ring, the board having electronic components thereto, the sensing elements being electrically coupled to the electronic components;
    a covering plate in engagement with the printed circuit board and connected to the force ring for holding the printed circuit board against the surface of the force ring; and
    a sensor cap covering the printed circuit board and covering plate and attached to the force ring.

2. The force sensor assembly of claim 1, wherein the covering plate further accommodates an electrical connector extending through the sensor cap.

3. The force sensor assembly of claim 2, wherein the covering plate comprises a plastic material.

4. he force sensor assembly of claim 1, wherein the covering plate comprises an internal metal clip secured to the force ring.

5. The force sensor assembly of claim 4, wherein the covering plate is provided with orientation elements to define a selected orientation of the sensors and the printed circuit board.

6. The force sensor assembly of claim 5, wherein the sensor cap is provided with at least one orientation element.

7. The force sensor assembly of claim 1, further comprising:
    a sealing member of compressible material between the covering plate and the sensor cap.

8. The force sensor assembly of claim 1, wherein the at least two sensing elements are evenly distributed on a circle on a top surface of the force ring.

9. The force sensor assembly of claim 8, wherein the covering plate further accommodates an electrical connector extending through the sensor cap, and wherein the covering plate comprises an internal metal clip secured to the force ring.

10. A force sensor assembly having an axis of measurement along an axial direction of the force sensor assembly, comprising:
    an elastically deformable force ring having force-receiving regions arranged to receive oppositely directed forces whereby the force ring may deform in response to application of forces to the force-receiving regions, the force ring having at least two sensing elements arranged to generate a signal corresponding to the degree of force ring deformation, the at least two sensing elements comprise four strain gauges arranged in a double parallel Wheatstone bridge configuration;
    a printed circuit board disposed on and supported by a surface of the force ring, the board having electronic components thereto, the strain gages being electrically coupled to the electronic components;

a covering plate in engagement with the printed circuit board and connected to the force ring for holding the printed circuit board against the surface of the force ring; and a sensor cap covering the printed circuit board and covering plate and attached to the force ring.

11. The force sensor assembly of claim 10, further comprising:

a sealing member of compressible material between the covering plate and the sensor cap, wherein the covering plate further accommodates an electrical connector extending through the sensor cap, and wherein the covering plate comprises an internal metal clip.

12. The force sensor assembly of claim 1, wherein the at least two sensing elements each have a sensitivity orientation in a plane corresponding to a top surface of the force ring, the sensitivity orientations being directed at an angle to the center axis of the force sensor assembly.

13. The force sensor assembly of claim 12, wherein the force ring is provided with profiling features.

14. The force sensor assembly of claim 13, wherein the covering plate further accommodates an electrical connector extending through the sensor cap, and wherein the covering plate comprises an internal metal clip.

15. The force sensor assembly of claim 1, wherein the printed circuit board and the covering plate are provided with openings.

16. The force sensor assembly of claim 15, wherein the at least two sensing elements are covered with a protective material in the openings.

17. The force sensor assembly of claim 1, wherein the force ring is provided with assembly features allowing attachment of the cover plate.

18. The force sensor assembly of claim 1, wherein the sensor cap is provided with at least one orientation element.

19. A method of assembling a force sensor assembly, the method comprising:

stacking a printed circuit board having electronic components with a covering plate;

fixing the printed circuit board and the covering plate on a force ring provided with at least two sensing elements, by attaching the covering plate to the force ring to sandwich the printed circuit board between the covering plate and a surface of the force ring;

electrically connecting the at least two sensing elements to the printed circuit board; and welding an outer rim and an inner rim of a sensor cap covering the printed circuit board and covering plate to the force ring.

20. The method as defined in claim 19 wherein the step of electrically connecting the sensing element to the printed circuit board comprises aligning the sensing elements with at least one aperture in the printed circuit board and effecting wire bonds between the sensing elements and components on the printed circuit board through the at least one aperture.

* * * * *